United States Patent
Li et al.

(10) Patent No.: US 7,984,883 B2
(45) Date of Patent: Jul. 26, 2011

(54) SUPPORT STRUCTURE

(75) Inventors: Jian-Jun Li, Shenzhen (CN); Te-Sheng Jan, Taipei Hsien (TW); Yu-Tao Chen, Taipei Hsien (TW); Chun-Che Yen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 520 days.

(21) Appl. No.: 12/177,115

(22) Filed: Jul. 21, 2008

(65) Prior Publication Data

US 2009/0223102 A1 Sep. 10, 2009

(30) Foreign Application Priority Data

Mar. 5, 2008 (CN) .......................... 2008 1 0300464

(51) Int. Cl.
*A47F 5/00* (2006.01)

(52) U.S. Cl. ............... 248/125.7; 248/349.1; 248/274.1; 248/222.11; 248/222.41; 248/371; 403/348; 403/349; 403/164; 403/97; 108/103; 396/419

(58) Field of Classification Search ............... 248/187.1, 248/177.1, 176.1, 157, 422, 423, 407, 477, 248/371, 346.06, 349.1, 27.1, 220.21, 221.11, 248/125.7, 222.11, 222.12, 222.13, 222.51, 248/222.52, 917, 922; 396/419; 403/348, 349, 353, 92–103, 91, 375, 321, 326
See application file for complete search history.

(56) References Cited

U.S. PATENT DOCUMENTS

| 5,588,625 | A | * | 12/1996 | Beak .............................. 248/371 |
| 5,632,463 | A | * | 5/1997 | Sung et al. ..................... 248/371 |
| 6,010,111 | A | * | 1/2000 | Cho .......................... 248/346.06 |
| 6,446,913 | B1 | * | 9/2002 | Schroeder .................... 248/27.1 |
| 2007/0036539 | A1 | * | 2/2007 | Martinez et al. .............. 396/419 |
| 2009/0101785 | A1 | * | 4/2009 | Jan et al. ..................... 248/349.1 |
| 2009/0223102 | A1 | * | 9/2009 | Li et al. ........................... 40/763 |

FOREIGN PATENT DOCUMENTS

JP 2002276058 9/2002

* cited by examiner

*Primary Examiner* — Terrell McKinnon
*Assistant Examiner* — Todd M. Epps
(74) *Attorney, Agent, or Firm* — Zhigang Ma

(57) ABSTRACT

An exemplary support structure includes a support body, a connecting body, and a rear board. The connecting body is fixed on the support body. The rear board is rotatable relative to the support body. The rear board defines a through hole therein. The connecting body forms a latch protrusion. When the support body is located at a first position, the latch protrusion is capable of passing the through hole of the rear board. When the support body and the latch protrusion are located at opposite sides of the rear board, and the support body rotates past the first position, the latch protrusion resists the rear board and prevents the support body detaching from the rear board.

9 Claims, 4 Drawing Sheets

SUPPORT STRUCTURE

BACKGROUND OF THE INVENTION

1. Field of the Invention

The present invention relates to support structures, especially to a support structure used in an electronic device.

2. Description of the Related Art

A digital photo frame generally includes a main body and a support structure. The support structure is configured to support the main body. The main body can be stably placed on a desk in such manner that the main body and a surface of the desk define an angle.

Generally, the support structure is fixed to the main body by screws. To assemble the support structure to the main body or detach the support structure from the main body, a specialized instrument, such as a screwdriver, is required. Without the specialized instrument, assembly and detachment of the digital photo frame are difficult.

Therefore, a new support structure for an electronic device is desired in order to overcome the above-described shortcoming.

SUMMARY

A support structure includes a support body, a connecting body, and a rear board. The connecting body is fixed on the support body. The rear board is rotatable relative to the support body. The rear board defines a through hole therein. The connecting body includes a latching protrusion. When the support body is located at a first position, the latching protrusion is capable of passing the through hole of the rear board. When the support body and the latching protrusion are located at opposite sides of the rear board, and the support body rotates past the first position, the latching protrusion resists the connecting body and prevents the support body detaching from the rear board.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support structure for an electronic device. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe embodiments of the present support structure in detail.

The present support structure is used for electronic devices, such as digital photo frames, electronic sign boards, flat-panel display monitors, and so on. In the illustrated embodiments, a support structure for a digital photo frame is taken as exemplary to describe the support structure of the present invention.

Figure 1:
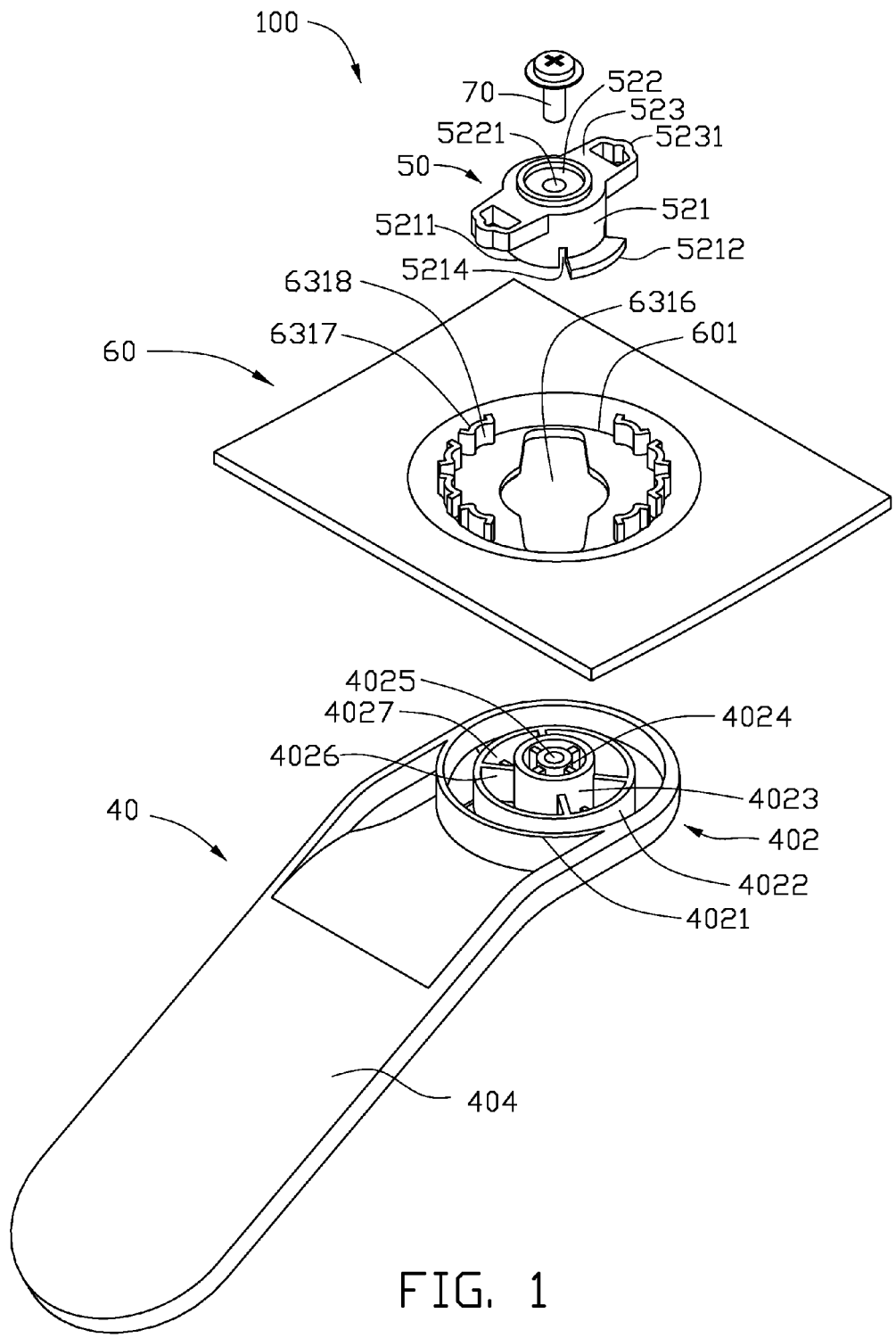
FIG. 1 is an exploded, isometric view of one embodiment of a support structure for an electronic device.
Figure 2:
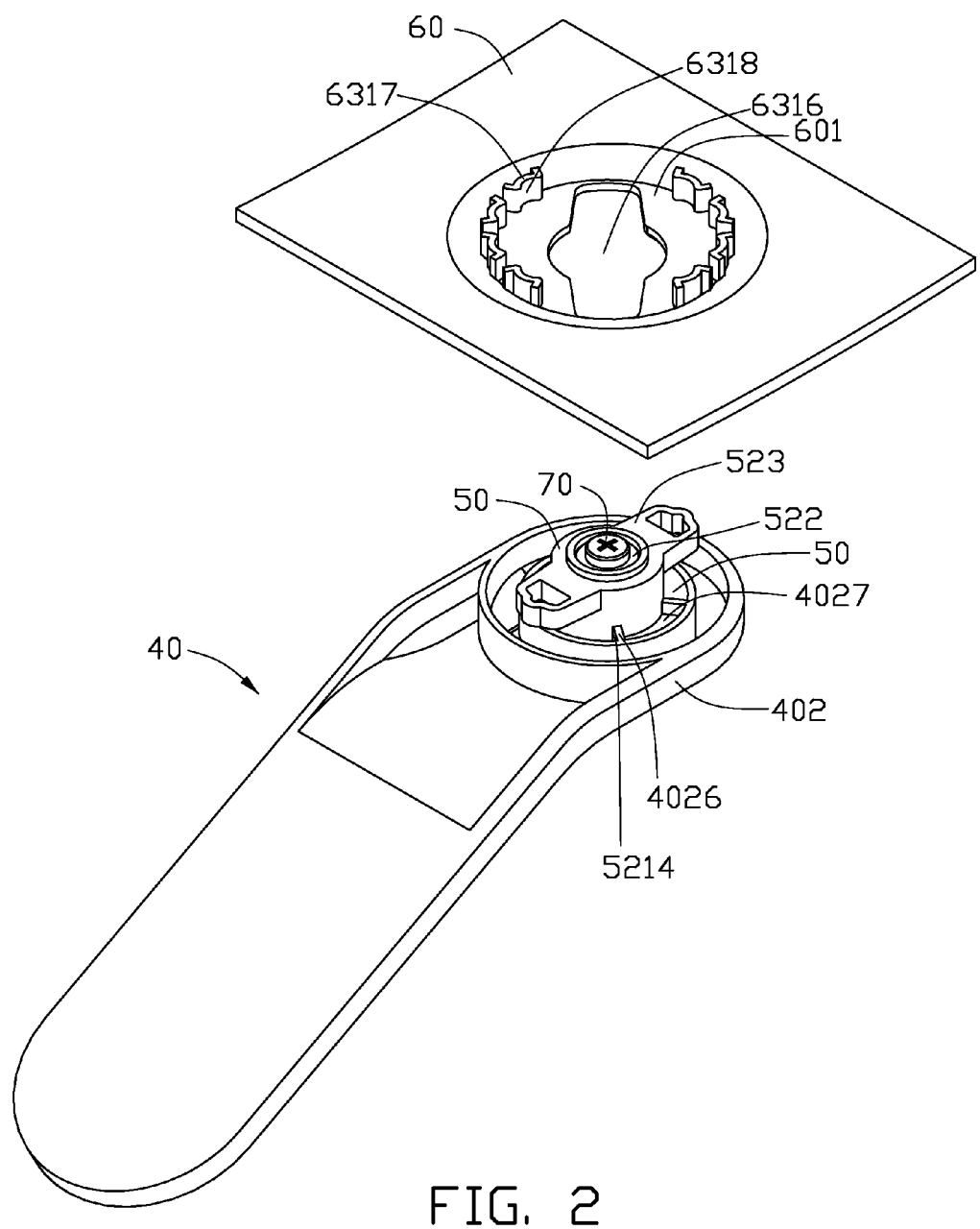
FIG. 2 is an exploded view of the support structure in FIG. 1, with the connecting body fixed on the support body.
Figure 3:
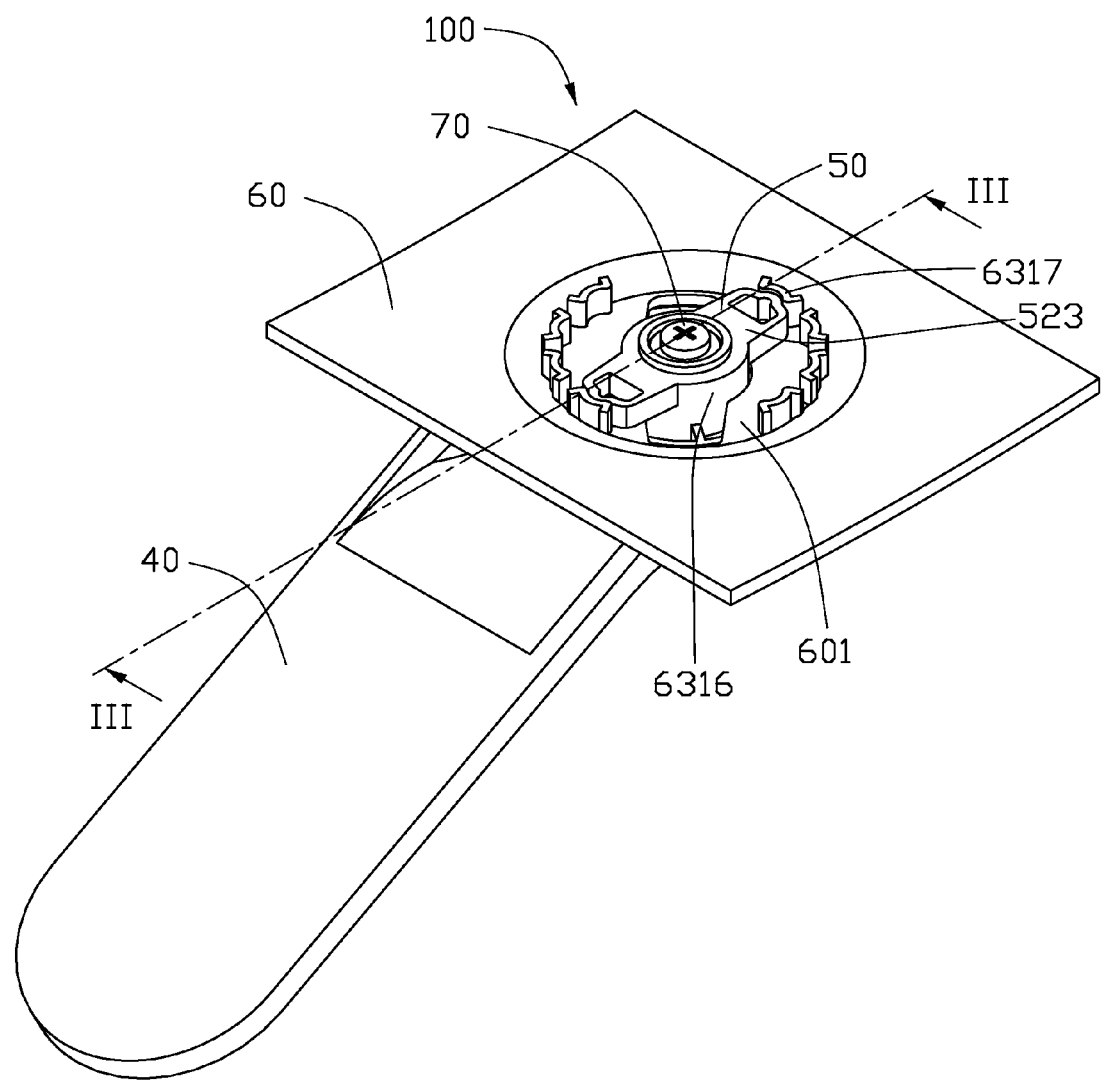
FIG. 3 is an assembled, isometric view of the support structure in FIG. 1.

Referring to FIG. 1, a support structure 100 for a digital photo frame (not shown) includes a support body 40, a connecting body 50, a rear board 60, and a bolt 70. The support body 40 is rotatably connected to the rear board 60 via the connecting body 50. The rear board 60 is configured to be connected to the photo frame. It can be understood that, the rear board 60 can also be a portion of the photo frame.

The support body 40 includes a connecting portion 402 and a support portion 404. The connecting portion 402 includes a first cylindrical member 4021, a second cylindrical member 4022, a third cylindrical member 4023, and a fourth cylindrical member 4024.

The first cylindrical member 4021, the second cylindrical member 4022, the third cylindrical member 4023, and the fourth cylindrical member 4024 are aligned along the same axis. The first cylindrical member 4021, the second cylindrical member 4022, the third cylindrical member 4023, and the fourth cylindrical member 4024 have a diameter decreased in that order. The heights of the third cylindrical member 4023 and the fourth cylindrical member 4024 is larger than the height of the first cylindrical member 4021 and the second cylindrical member 4022. A screw hole 4025 is defined in the fourth cylindrical member 4024.

The connecting portion 402 includes four latching walls 4026. The latching walls 4026 are connected between the second cylindrical member 4022 and the third cylindrical member 4023. The four latching walls 4026, the second cylindrical member 4022, and the third cylindrical member 4023 cooperatively define four restriction grooves 4027.

The connecting body 50 includes a barrel portion 521. The barrel portion 521 defines an opening 5211 in an end and a top 522 formed in the other end. A through hole 5221 is defined in the top 522. The bolt 70 is capable of being passed through the through hole 5221. The inner diameter of the barrel portion 521 is larger than an outer diameter of the third cylindrical member 4023, thus the barrel portion 521 is capable of being sleeved on the third cylindrical member 4023.

A periphery of the top 522 forms two symmetrical latching protrusions 523. A periphery of the opening 5211 of the barrel portion 521 forms a pair of restricting blocks 5212. The barrel portion 521 also defines four latching grooves 5214. The latching grooves 5214 are adjacent to the sides of the restricting blocks 5212. In the illustrated embodiment, the latching protrusions 523 are substantially rectangular. The connecting body 50 is made of plastic and the latching protrusions 523 are resilient. An end surface 5231 of the latching protrusions 523 is bended.

Figure 4:
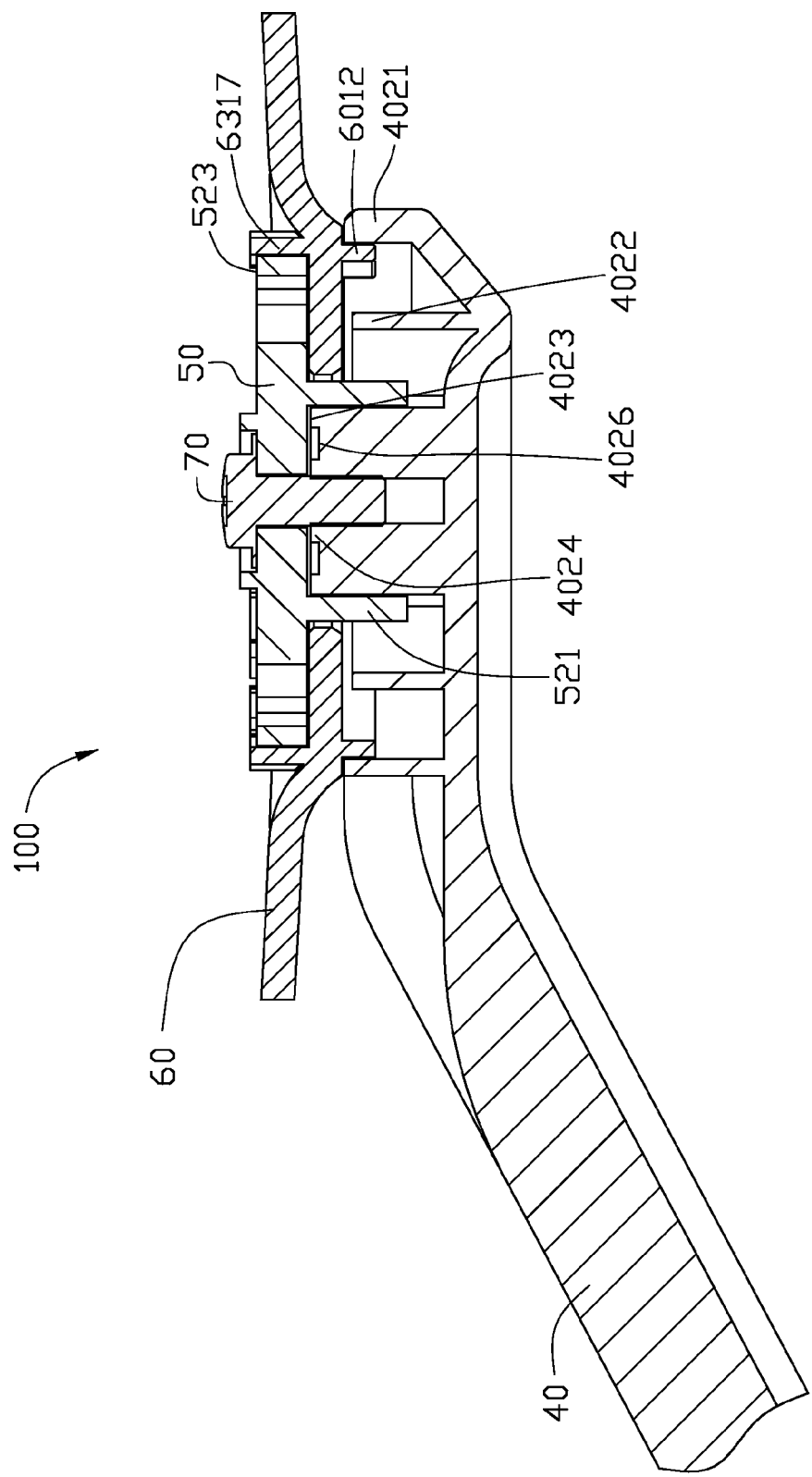
FIG. 4 is a cross-sectional view taken along the line III-III in FIG. 3.

Referring to FIGS. 1 and 4, the rear board 60 is substantially a rectangular plate in shape. A circular depression (not labeled) is defined in a middle portion of the rear board 60. The rear board 60 includes a circular bottom 601 formed in the depression.

A deformed through hole 6316 is defined in the bottom 601. In the illustrated embodiment, the deformed through hole 6316 is a combination of a circular through hole and a rectangular through hole crossing the circular through hole. The inner diameter of the circular through hole is larger than the outer diameter of the barrel portion 521, and the distance between the end of one latching protrusion 523 and the end of the other latching protrusion 523 is smaller than the length of the rectangular through hole. Therefore, when the latching protrusions 523 are aligned along a longitudinal direction of the rectangular through hole, the latching protrusions 523 are capable of passing through the rectangular through hole.

After the latching protrusions 523 are passed through the deformed through hole 6316, the barrel portion 521 is rotatably received in the deformed through hole 6316.

A side of the bottom 601 forms a plurality of pairs of locating pieces 6317. In each pair of the locating pieces 6317, the two locating pieces 6317 are symmetrical relative to the center of the through hole. Each locating piece 6317 forms an arched groove 6318. The arched grooves 6318 are configured for engaging with the latching protrusions 523. Thus, one pair of the locating pieces 6317 is capable of retaining the support body 40 in a stable position relative to the rear board 60.

The rear board 60 also forms a plurality of ribs 6012. The ribs 6012 and the locating pieces 6317 are located on opposite sides of the rear board 60 respectively. When the support body 40 rotates relative to the rear board 60, the rib 6012 resists an inner side of the first cylindrical member 4021 to prevent the support body 40 from wiggling.

Referring to FIGS. 1 through 4, to assemble the support structure 100, the following steps are provided.

First step, the connecting body 50 is fixed on the support body 40. The barrel portion 521 is sleeved on the third cylindrical member 4023, the two restricting blocks 5212 are inserted into two corresponding restriction grooves 4027, the four latching walls 4026 are engaged in the four latching grooves 5214 respectively. After that, the bolt 70 is passed through the through hole 5221 and engages in the screw hole 4025, thus, the connecting body 50 is fixed on the support body 40.

Second step, assemble the support body 40 to the rear board 60. When the latching protrusions 523 are aligned along the longitudinal direction of the rectangular hole of the rear board 60, the support body 40 is located at a first position. The latching protrusion 523 are passed through the deformed through hole 6316 and are rotated a desired angle, then the support body 40 and the latching protrusions 523 are located on opposite sides of the rear board 60, the latching protrusions 523 are latched in two corresponding arched grooves 6318. As a consequence, the support body 40 is rotatably fixed on the rear board 60, thus yielding the support structure 100 in FIG. 2.

During operation, an external force is manually applied on the support body 40 to rotate the support body 40, the support body 40 rotates relative to the rear board 60. When the latching protrusions 523 are latched on one pair of locating pieces 6317, the support body 40 is remained in a stable position relative to the rear board 60. In addition, an angle is defined by the support body 40 and the rear board 60.

After a digital photo frame is fixed on the rear board 60, and the digital photo frame and the support structure 100 are placed on a desk. The digital photo frame and the support body 40 cooperatively define a desired angle such that the photo frame forms a slope relative to the desk.

Moreover, in contrast to the conventional photo frame, the support body is fixed on the main body by screws, after the support body is fixed on the main body, an angle defined by the support body and the main body is fixed, the slope of the photo frame is difficult to be adjusted. The support structure 100 is used to support a digital photo frame, when an external force is manually applied on the support body 40 to rotate the support body 40, the support body 40 rotates, the latching protrusions 523 slide from one pair of locating pieces 6317 to another pair of locating pieces 6317. Then the slope of the photo frame is easily adjusted.

To detach the support body 40 from the rear board 60, only to rotate the support body 40 to return to the first position, the latching protrusion 523 is able to pass through the deformed through hole 6316 such that the support body 40 is detached from the rear board 60.

In a process of detaching or detaching the support structure 100 to the rear board 60, rotating the support body 40 and making it slide through the deformed through hole 6316 is the major steps to perform, which is simple and convenient.

In the support structure 100, the rib 6012 is able to resist the inner side of the first cylindrical member 4021, the support body 40 is restrained to prevent from wiggling, thus the support structure 100 has a high reliability. In addition, the latching protrusions 523 engage with the arched grooves 6318, the latching protrusions 523 are resilient, only a relatively small force is able to drive the latching protrusions 523 to slide from one pair of arched grooves 6318 to another pair of arched grooves 6318, therefore, an angle defined by the support body 40 and the desk can be easily adjusted.

It can be understood that, when the support body 40 is integrally formed with the connecting body 50, the bolt 70 can be omitted. When the outer diameter of the barrel portion 521 is substantially equal to the inner diameter of the through hole, the inner side of the through hole is able to resist the barrel portion 521, in this configuration, only one latching protrusion 523 is needed.

It can be understood that, the latching protrusions 523 can also be un-resilient and the locating piece 6317 is made of resilient materials such as plastic.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A support structure, comprising:
   a support body,
   a connecting body forming at least one latching protrusion, the connecting body being fixed on the support body; and
   a rear board defining a through hole therein, the rear board being rotatably fixed to the support body via the connecting body,
   wherein, the rear board forms at least one locating piece; when the support body is located at a first position, the at least one latching protrusion is capable of passing the through hole of the rear board; when the support body and the at least one latching protrusion are located at opposite sides of the rear board, and the support body rotates past the first position, the at least one latching protrusion resists the rear board and prevent the support body from detaching from the rear board; after the at least one latching protrusion is passed through the through hole of the rear board, the support body and the at least one latching protrusion are located on opposite sides of the rear board, and the at least one latching protrusion engages with the at least one locating piece, the connecting body remains a stable state relative to the rear board.

2. The support structure as claimed in claim 1, wherein an end surface of each of the at least one latching protrusion is bended; the at least one locating piece is adjacent to the through hole, each of the at least one locating piece defines an arched groove incapable of engaging with the bended surface of one of the at least one latching protrusion so that the rear body engages in the arched groove.

3. The support structure as claimed in claim 1, wherein the least one locating piece of the rear board is a plurality of pairs of locating pieces.

4. The support structure as claimed in claim 1, wherein a depression is defined in the rear board, the rear board includes a bottom formed in the depression, the through hole is defined in the bottom, and the at least one locating piece is formed on a side of the bottom.

5. The support structure as claimed in claim 1, wherein the through hole is a combination of a circular through hole and a rectangular through hole crossing the circular through hole, the at least one latching protrusion is a rectangular block, when the rectangular block is aligned along the longitudinal direction of the rectangular hole, the connecting body is located at the first position.

6. The support structure as claimed in claim 1, wherein the connecting body includes a barrel portion, the barrel portion includes an opening in an end thereof and a top formed in the other end thereof, the at least one latching protrusion is formed on the periphery of the top of the barrel portion, the support body forms a first cylindrical member, a diameter of the first cylindrical member is smaller than an inner diameter of the barrel portion, the barrel portion is positioned on the first cylindrical member.

7. The support structure as claimed in claim 6, wherein the barrel portion further forms a restricting block adjacent to the opening on the outer periphery of the barrel portion, the barrel portion defines a latching groove therein, the latching groove is adjacent to the restricting block, the support body forms a latching wall, a restriction groove is defined in the support body, the latching wall is configured for engaging with the latching groove, the restriction groove is configured for engaging with the restricting block.

8. The support structure as claimed in claim 6, wherein the rear board forms a rib, the support body forms a second cylindrical member, a diameter of the second cylindrical member is larger than that of the first cylindrical member, the first cylindrical member and the second cylindrical member are aligned along a same axis, when the support body rotates relative to the rear board, the rib resists an inner side of the second cylindrical member.

9. The support structure as claimed in claim 1, wherein the connecting body is integrally formed with the support body.

* * * * *